(12) United States Patent
Christophel et al.

(10) Patent No.: US 7,475,883 B2
(45) Date of Patent: Jan. 13, 2009

(54) DEVICE FOR SUSPENSION AND LEVEL ADJUSTMENT IN MOTOR VEHICLES

(75) Inventors: Aurelie Christophel, Durrenbach (FR); Christoph Raber, Ottweiler-Steinbach (DE); Ivo Agner, Bühl (DE); Andre Speck, Malsch (DE)

(73) Assignee: Luk Lamellen und Kupplungsbau Beteiligungs KG, Buehl (DE)

(*) Notice: Subject to any disclaimer, the term of this patent is extended or adjusted under 35 U.S.C. 154(b) by 403 days.

(21) Appl. No.: 11/350,138

(22) Filed: Feb. 8, 2006

(65) Prior Publication Data

US 2006/0175776 A1 Aug. 10, 2006

(30) Foreign Application Priority Data

Feb. 8, 2005 (DE) .................. 10 2005 005 855

(51) Int. Cl.
*B60G 17/00* (2006.01)
*B60G 17/016* (2006.01)
*B60G 17/018* (2006.01)

(52) U.S. Cl. ............... 280/5.514; 280/6.157; 280/43.17
(58) Field of Classification Search .............. 280/5.514, 280/5.515, 5.519, 6.157, 43, 43.17; 267/174, 267/175, 176, 177, 178, 218, 221
See application file for complete search history.

(56) References Cited

U.S. PATENT DOCUMENTS

| | | | |
|---|---|---|---|
| 5,060,959 A * | 10/1991 | Davis et al. ............... 280/5.514 |
| 5,306,031 A * | 4/1994 | Quinn et al. .............. 280/6.15 |
| 5,553,836 A * | 9/1996 | Ericson .................... 267/286 |
| 5,678,847 A * | 10/1997 | Izawa et al. .............. 280/5.515 |
| 6,857,625 B2 * | 2/2005 | Loser et al. ............... 267/175 |
| 7,135,794 B2 * | 11/2006 | Kuhnel ..................... 310/80 |
| 2004/0036206 A1* | 2/2004 | Loser et al. ............... 267/218 |
| 2006/0163787 A1* | 7/2006 | Munster et al. ........... 267/221 |

FOREIGN PATENT DOCUMENTS

DE 201 05 329 U1 7/2001

* cited by examiner

*Primary Examiner*—Paul N. Dickson
*Assistant Examiner*—Joseph Rocca
(74) *Attorney, Agent, or Firm*—Davidson, Davidson & Kappel, LLC

(57) ABSTRACT

A device for suspension and level adjustment in motor vehicles has a first connection element for connecting to at least one vehicle wheel, a second connection element for connecting to the body of the motor vehicle, at least one chassis spring, and an adjusting device. The adjusting device has two bearing points which are adjustable in their distance to one another via a gear driven by a motor. A first bearing point is connected to one connection element. A second bearing point is supported against the other connection element via the chassis spring. The gear has a coiled spring and at least one engagement element which engages between at least two coils of the spring adjacent to one another. The gear spring is assigned to the one bearing point and the engagement element is assigned to the other bearing point. The gear spring and the engagement element are pivotably mounted relative to one another and, for adjusting the distance of the bearing points, are able to be rotationally driven using a drive motor.

29 Claims, 11 Drawing Sheets

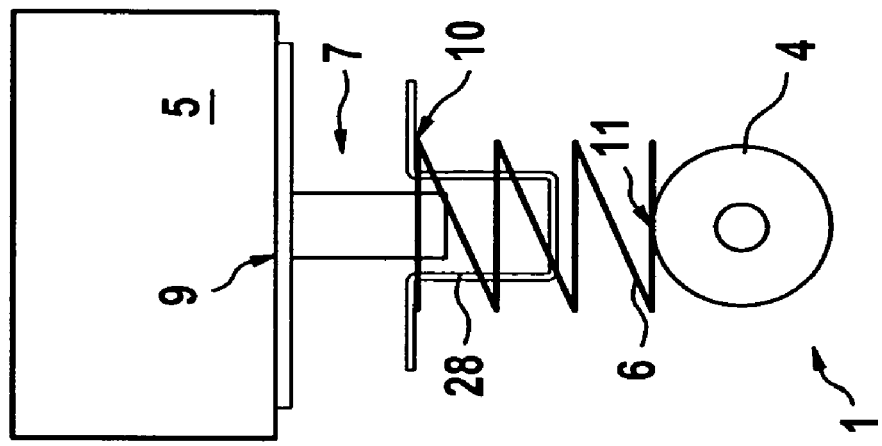
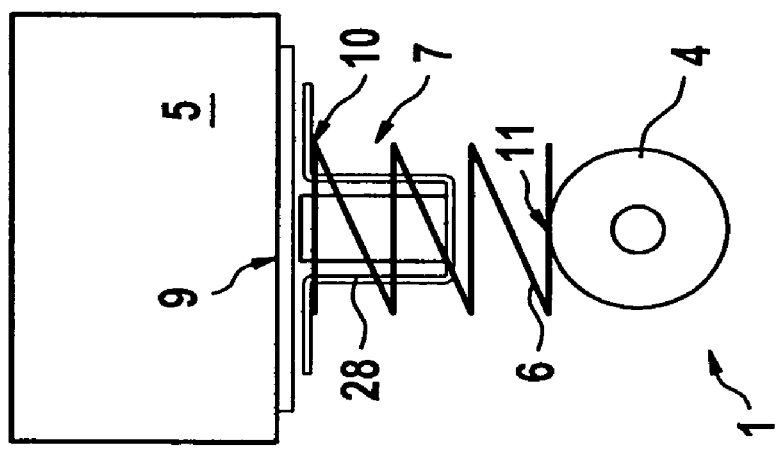
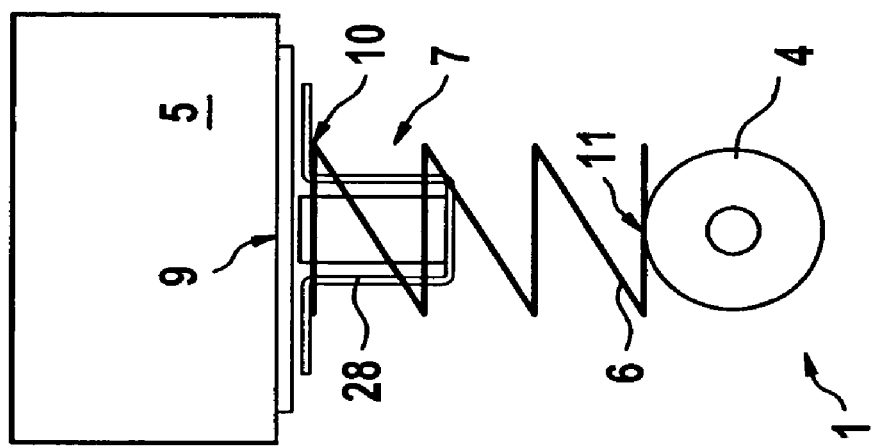

(B - B)

(B - B)

US 7,475,883 B2

DEVICE FOR SUSPENSION AND LEVEL ADJUSTMENT IN MOTOR VEHICLES

CROSS REFERENCE TO RELATED APPLICATION

This claims the benefit of German Patent Application No. 10 2005 005 855.8 filed Feb. 8, 2005 and hereby incorporated by reference herein.

The present invention provides a device for suspension and level adjustment in motor vehicles having a first connection element for connecting to at least one vehicle wheel and a second connection element for connecting to the body of the motor vehicle, including at least one chassis spring and an adjusting device which has two bearing points which are adjustable in their distance to one another via a gear drivable by a drive motor, a first bearing point of which being connected to or situated on the one connection element and a second bearing point being supported against the other connection element via the chassis spring.

BACKGROUND OF THE INVENTION

Such a device is known from DE 201 05 329 U1. It has a helical spring as the chassis spring which, at its lower end, engages in a wheel-side receptacle and rests at its upper end against a spindle nut of a spindle gear. The spindle of the gear is pivotably mounted on the body of the motor vehicle and drivable by an electric motor for adjusting the level of the body. Moreover, the device has an auxiliary spring which bridges the arrangement made up of the chassis spring and the gear and supports the vehicle body directly against the wheel-side receptacle. The auxiliary spring is also designed as a helical spring and is situated concentrically around the chassis spring. The electrical motor is situated above the chassis spring and the auxiliary spring. The spindle of the gear engages in the space enclosed by the coils of the springs. The device has the disadvantage that it has a relatively long spindle path which requires a correspondingly large installation space in the inside of the chassis spring and the auxiliary spring, so that the electric motor must be placed above the springs.

SUMMARY OF THE INVENTION

An object of the present invention is to create a device which makes compact dimensions and a great load-bearing capacity possible.

The present invention provides a gear with a coiled spring and at least one engagement element engaging between at least two coils adjacent to one another, in that the gear spring is assigned to the one bearing point and the engagement element is assigned to the other bearing point, and in that the gear spring and the engagement elements are pivotably mounted relative to one another and, for adjusting the distance of the bearing points, are able to be rotationally driven using the drive motor.

The gear spring, which preferably has a band-shaped design having an approximately rectangular cross section, makes a high gear ratio possible so that the drive motor for the gear may have correspondingly compact dimensions. In an advantageous manner, the gear spring also makes the support of great loads possible. In contrast to a spindle nut gear, the spring band gear according to the present invention exhibits greater efficiency in the case of slight inclines and great loads. In addition, the spring band gear may be safely designed to be self-locking.

It may be advantageous when the drive motor is an electric motor, in particular a brushless EC motor. The device permits a simple construction in which expensive hydraulic or pneumatic components may be dispensed with. The electric motor may be controlled with the aid of a controller which has a level sensor in order to keep the level of the body constant under different loads or to adjust it to different operating conditions, such as driving off-road or on the highway or secondary road. It is even possible to separately control or adjust the body level at the individual axles or wheels of the vehicle.

In a preferred embodiment of the present invention, the drive motor may be, at least partially, situated in the space surrounded by the coils of the gear spring. In addition, the device makes more compact dimensions possible.

The EC motor may have an actuator for its winding which is situated in the space surrounded by the coils of the gear spring. The device makes an even more compact configuration possible.

In an advantageous embodiment of the present invention, the gear may be designed as a self-locking gear. The electric motor then only needs to be supplied with current during the adjustment of the gear.

The drive motor may be advantageously designed as an external-rotor motor having a rotor situated around a stator, the engagement elements being provided on the outer circumference of the rotor. The individual parts of the device are then able to be manufactured and assembled cost-effectively.

In another embodiment of the present invention, the drive motor may be situated on the outer circumference of the gear spring, preferably around it. The drive motor may be designed as an internal-rotor motor having a stator situated around an annular rotor, so that the engagement elements may be provided on the inner circumference of the rotor. This design of the device may also be manufactured cost-effectively.

It may be particularly advantageous when the chassis spring is a coiled spring, a helical spring or a spiral spring in particular, and when the drive motor or the gear spring is at least partially situated in the space surrounded by the coils of the chassis spring. The device has particularly compact dimensions in this case. Of course, other embodiments are also conceivable, in which a leaf spring or a torsion spring may be provided as the chassis spring.

In a preferred embodiment of the present invention, the connection elements can be connected to one another and movable relative to one another via an axial guide. The axial guide is preferably situated parallel to the longitudinal axis of the gear spring. Forces which are oriented transversely to the longitudinal axis of the gear spring may be transferred via the axial guide between the wheel-side connection element and the chassis-side connection element in an advantageous manner. The drive motor and the gear spring are thus kept free of transverse forces to the greatest possible extent.

The axial guide advantageously may have a guide sleeve movably situated on a pilot pin, the drive motor or the gear spring being situated around the guide sleeve. The device makes particularly compact dimensions possible in this case.

In a different embodiment of the present invention, the axial guide may have an inner guide sleeve and an outer guide sleeve movable relative to the former, the drive motor or the gear spring being at least partially situated in the space surrounded by the inner guide sleeve. Such a device is preferably used in situations where there is sufficient installation space available.

It may be advantageous when the adjusting device has an approximately hat-shaped housing part in whose inner cavity the gear spring and the drive motor are provided, that the housing part engages in the space surrounded by the coils of the chassis spring, and that the second bearing point of the adjusting device is situated on the external edge of the housing part and preferably has a recess for receiving one axial end of the chassis spring. The housing part may then be manufactured cost-effectively as a punched and bent part made of sheet metal.

Advantageously, the pilot pin is preferably situated approximately centered on the bottom of the hat-shaped housing part in such a way that it protrudes into the inner cavity of the housing part. The pilot pin may then be rigidly connected to the hat-shaped housing part, by a weld or a pressing point for example. With its longitudinal axis, the pilot pin is preferably oriented approximately parallel to the longitudinal axis of the housing part. The symmetrical arrangement of the pilot pin on the housing part makes simple manufacturing and assembly of the components possible. The pilot pin may be designed as a solid part or as a tubular hollow part.

In an advantageous embodiment of the present invention, a flange, which extends transversely to the longitudinal axis of the guide sleeve, may be connected to same, the external edge of the flange being connected to the external edge of the hat-shaped housing part via an elastic gasket, a corrugated bellows or a roll bellows in particular. The components of the device, situated in the inner cavity of the hat-shaped housing part, are then sealed by the housing part, the flange, and the gasket against the space outside of the device and are thus protected against the influx of moisture or contamination. The inner cavity of the hat-shaped housing part may be filled with oil if needed in order to reduce the friction in particular between the gear spring and the engagement elements. A corrugated bellows or a roll bellows is preferably provided as the gasket.

It may be advantageous when coils of the gear spring, distanced from the engagement elements, are essentially in contact. This makes a short configuration of the device possible.

In a preferred embodiment of the present invention, the at least one engagement element may have an axle on which, preferably via an antifriction bearing, a roll is pivotably mounted in such a way that, during twisting of the engagement elements, it rolls relative to the gear spring. The friction between the engagement elements and the gear spring is thus reduced during adjustment of the gear. The drive motor may then have even more compact dimensions.

It is particularly advantageous when the device can have multiple engagement elements which are offset with respect to one another along a coil of the gear spring in such a way that the engagement elements simultaneously take hold of the coil. Even greater axial forces may then be transferred via the gear. The engagement elements are preferably distributed over the entire circumference of the gear spring so that axial forces may be transferred, evenly and preferably distributed approximately symmetrically over the circumference of the gear spring, from the chassis-side second connection element to the wheel-side first connection element.

The axles of the rolls of at least two rolls, which are situated side-by-side in circumferential direction of the gear spring and engage between the coils of the gear spring, may be offset with respect to one another transversely to the circumferential direction in such a way that a first roll or a first group of rolls takes hold of only one coil and a second roll or a second group of rolls takes hold of only the other coil. The distance or the clearance between the two coils is then greater than the diameter of the rolls so that the rolls only come in contact with one of the two spring coils. The device has even smaller friction losses during the adjustment of the chassis level.

In a preferred embodiment of the present invention, the device may have a sleeve element, situated approximately concentrically to the gear spring and in drive connection with the drive motor, which has on its one end an edge area bent approximately in a U-shape which has two U-legs connected to one another by a U-cross bar, the U-legs having at least two bearing openings, aligned with respect to one another in the radial direction, into which the axle of the at least one engagement element is inserted, the roll being situated on the axle between the U-legs, a through-opening for the roll being provided in the U-cross bar, and the roll taking hold of the coil of the gear spring through the through-opening. The sleeve element thus has great bending rigidity and may be manufactured cost-effectively from a tube as a punched and bent part.

The sleeve element is preferably supported pivotably around its longitudinal axis on the guide sleeve via an antifriction bearing or a slide bearing. The friction losses during the adjustment of the device may thus be reduced even further.

It is advantageous when a guide tube can be provided for lateral guiding of the coils of the gear spring which, when force is applied to the connection elements, are interspersed with a force from the flux of force, the guide tube with its external cylindrical surface preferably facing the interior of the coils. When a load occurs between the chassis-side second connection element and the wheel-side first connection element, a lateral deflection of the gear spring coils acted upon by the load is avoided due to the guide tube. In the event of compact dimensions in the longitudinal direction of the gear spring, the device makes the transfer of great loads possible.

It is advantageous when, in addition to the chassis spring, the device may have an auxiliary spring linking the connection elements directly or indirectly via at least one intermediate element. The auxiliary spring may then be designed for supporting the unloaded weight of the body, so that the gear of the device has to support only the additional load. The auxiliary spring may be a coiled spring, e.g., a helical spring, a barrel spring, a mini block spring, or a leaf or torsion spring.

The spring rigidity of the chassis spring used in the single spring embodiment is preferably between 30% and 60% of the resulting total spring rigidity of the chassis spring and the auxiliary spring of the two spring embodiment. This design of the springs has been found to be appropriate in practice.

BRIEF DESCRIPTION OF THE DRAWINGS

Exemplary embodiments of the present invention are subsequently explained in greater detail based on the drawings.

FIG. 5a shows a schematic representation of a device for suspension and level adjustment in a motor vehicle, the motor vehicle being unloaded.

FIG. 5b shows a representation similar to FIG. 5a. However, the motor vehicle is loaded.

FIG. 5c shows a representation similar to FIG. 5b. However, the shortening of the chassis spring caused by the load of the motor vehicle is compensated by appropriately adjusting the device for level adjustment.

DETAILED DESCRIPTION OF A PREFERRED EMBODIMENT

Figure 1:
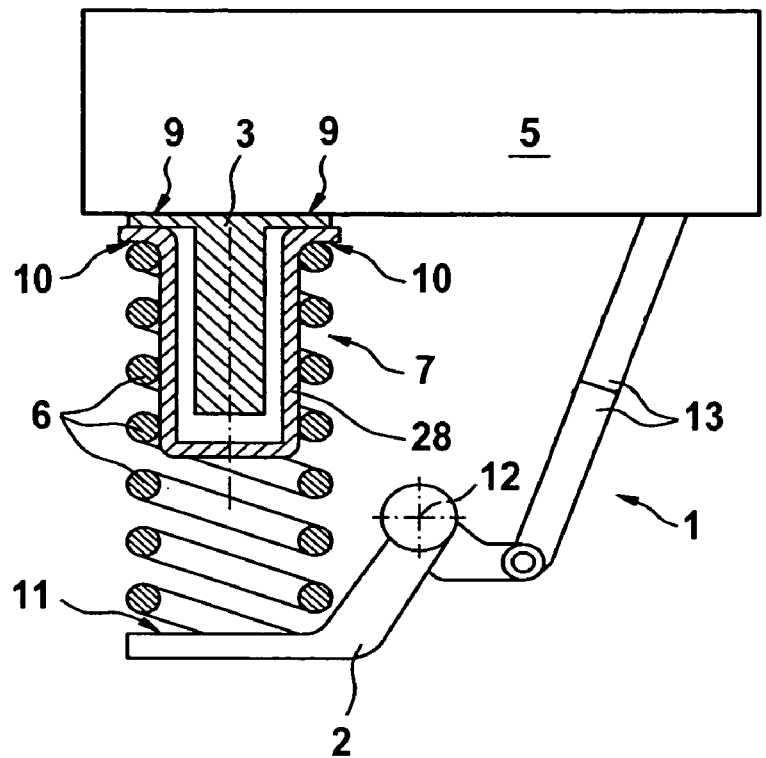
FIGS. 1 and 2 show a longitudinal section of a device for suspension and level adjustment situated in a motor vehicle.

A device for suspension and level adjustment in motor vehicles 1 includes a first connection element 2 for the connection to at least one vehicle wheel 4 and a second connection element 3 for the connection to a body 5 of the motor vehicle. Body 5 is shown schematically in the drawing.

Furthermore, device 1 has a chassis spring 6 and an adjusting device 7 which has two bearing points 9, 10 which are adjustable in their distance to one another via a gear 8 (FIG. 3) driven by a motor. A first bearing point 9 is situated on second connection element 3 and a second bearing point 10 is supported against first connection element 2 via chassis spring 6. The distance of body 5 to the ground may be adjusted with the aid of an adjusting device 7. Chassis spring 6 is designed as a helical spring in the exemplary embodiments shown in the drawing. However, a leaf spring may also be provided.

Figure 2:
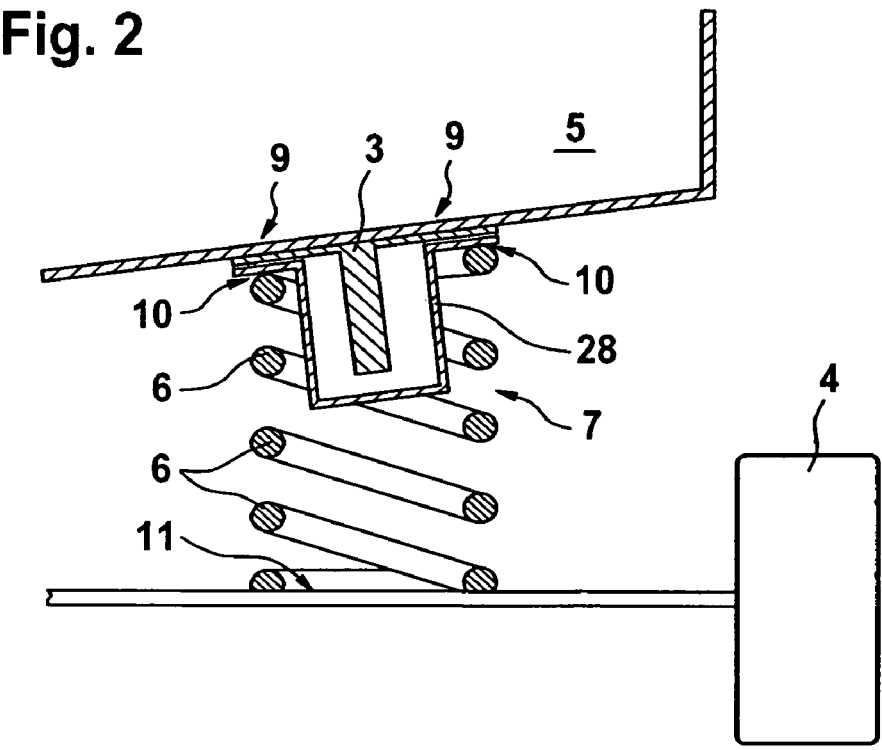

In the exemplary embodiment shown in FIG. 1, a point of support 11 for a lower end of chassis spring 6 is provided on first connection element 2, the point of support 11 being situated below and laterally distanced from a wheel axle 12 of vehicle wheel 4. Distanced from wheel axle 12, first connection element 2 is supported against body 5 via a shock absorber 13. On its one end, shock absorber 13 has a swivel connection to first connection element 2 and on its other end a swivel connection to body 5. In FIG. 2, point of support 11 for chassis spring 6 is situated above wheel axle 12. During compression and rebound of the spring, axle 12 together with connection element 2 moves preferably approximately in a vertical direction relative to body 5. For the sake of simplicity, first connection element 2 having point of support 11 is not shown in detail in FIG. 2. Vehicle wheel 4 is situated on a wheel carrier (not shown in detail in the drawing) which is connected to body 5 via linkage arms.

Figure 3:
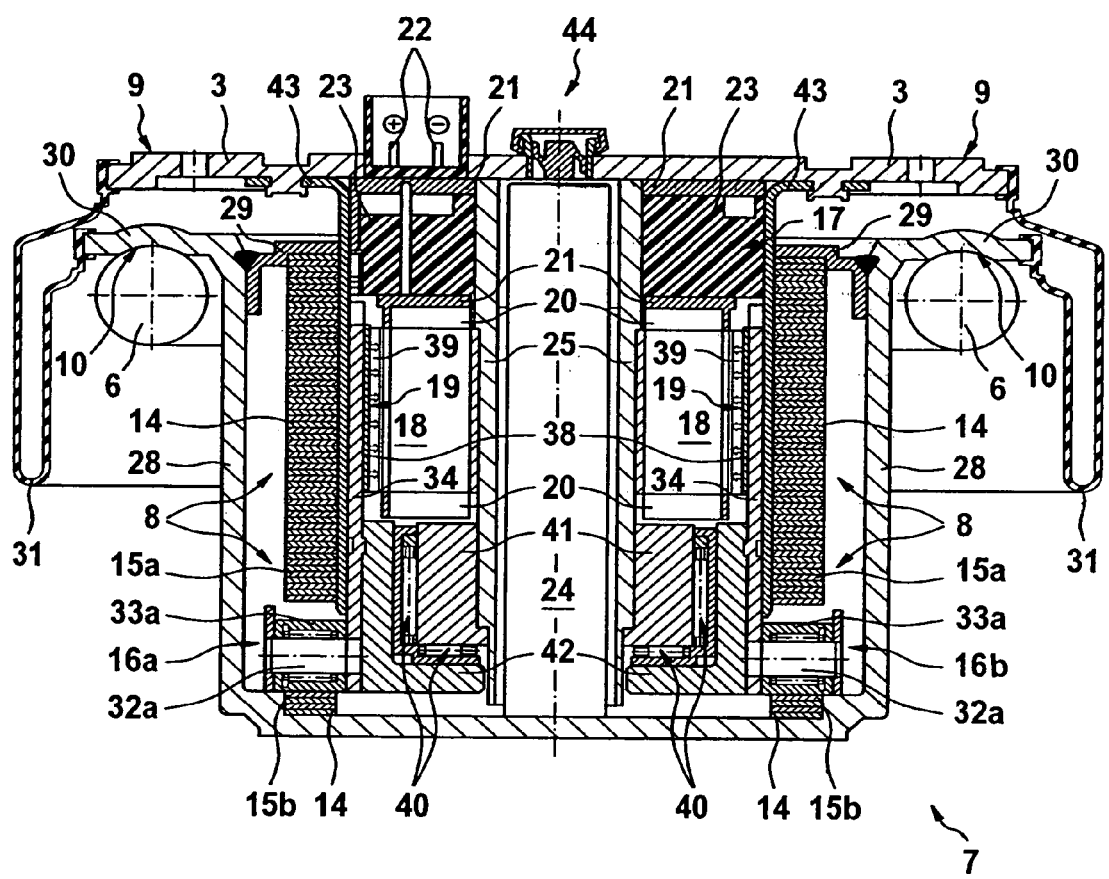
FIG. 3 shows a partial longitudinal section of a first exemplary embodiment of a device for suspension and level adjustment in motor vehicles which has bearing points, adjustable in their distance to one another, for the connection to a chassis spring and the body of the motor vehicle.
Figure 4:
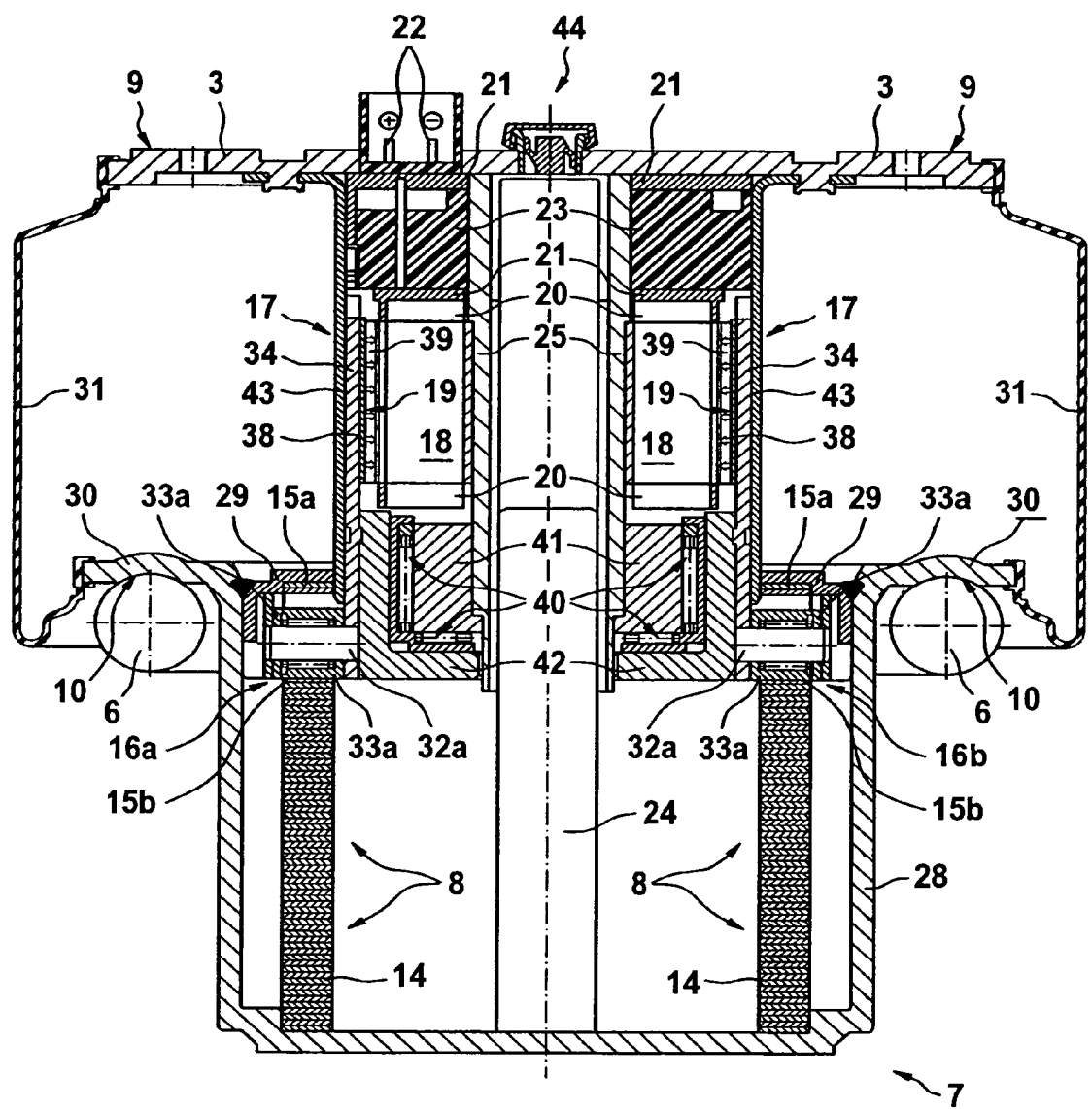
FIG. 4 shows a representation similar to FIG. 3. However, the distance of the bearing points is enlarged vis-A-vis FIG. 3.

FIGS. 3 and 4 show gear 8 of adjusting device 7 having a coiled spring 14, i.e., a helical spring, which has a plurality of coils. Multiple engagement elements 16a, 16b, distributed over the circumference of gear spring 14, engage between two adjacent coils 15a, 15b which are distanced from one another in the axial direction of gear spring 14 by a free space.

The coils have an approximately rectangular cross section and the coils of the gear spring distanced by the free space are essentially in contact. Adjacent coils are in contact with their flat sides facing one another. The gear spring is made of a metal band, preferably for example a steel band, which is coiled in a helical shape during manufacturing.

Gear spring 14 is assigned to second bearing point 10 supported against chassis spring 6 and engagement elements 16a, 16b are assigned to first bearing point 9. In order to adjust the distance of bearing points 9, 10, gear spring 14 and engagement elements 16a, 16b are pivotably mounted relative to one another and may be rotationally driven by a drive motor 17.

In the unloaded body, connection elements 2, 3 are in an initial position in which they are situated at a small distance from one another or lie on top of each other. By comparing FIG. 5a and FIG. 5b it can be seen that chassis spring 6 compresses when body 5 is loaded, whereby the distance of body 5 to the ground, which is referred to in the following as the level, decreases. This distance reduction is measured using a sensor in order to actuate adjusting device 7 in such a way that the distance reduction decreases. By comparing FIG. 5a and FIG. 5c it can be seen that, subsequent to the actuation of adjusting device 7, the level of loaded body 5 corresponds approximately to the level of unloaded body 5, i.e., the decrease in the length of chassis spring 6 caused by loading of the body is compensated by adjusting device 7. With the aid of adjusting device 7, the level of body 5 is thus regulated to a constant value largely independent of the load.

A brushless, electronically commutated electric motor (EC motor) is provided as drive motor 17 which, in the exemplary embodiments shown in FIGS. 3 and 4, is at least partially situated in the space surrounded by the coils of gear spring 14. FIG. 3 shows drive motor 17 in an initial position, in which engagement elements 16a, 16b are situated at the end area of gear spring 14 away from first bearing point 9, is almost completely situated inside of gear spring 14.

Drive motor 17 is designed as an external-rotor motor having a stator 18 and a rotor 19 situated around it. On its outer circumference, stator 18 has multiple teeth offset with respect to one another in the circumferential direction which are provided with a multi-pole winding 20 in a manner that is known per se. Winding 20 is connected to electrical terminals 22 via at least one printed circuit board 21 on which electronic components for the actuator electronics for the commutation of the winding 20 may be situated. According to the exemplary embodiment in FIGS. 3 and 4, two of these printed circuit boards 21 are situated approximately parallel to one another, namely between second connection element 3 and stator 18. An actuator for the commutation may also be situated separately outside the housing of gear 8.

Printed circuit boards 21 extend in planes which are oriented approximately normal to the rotation axis of drive motor 17. An electrical insulation layer 23, preferably made of plastic, is provided between printed circuit boards 21. FIGS. 1, 3, and 4 show electrical terminals 22 situated on the front of second connection element 3 facing away from first connection element 2. Connection element 3 has a flange with openings which in the service position are firmly connected to the body via joints (not shown in detail in the drawing) such as friction locked or form-fitted plastic supports. An opening for electrical terminals 22 is provided on the body.

Connection elements 2, 3 are connected to one another via an axial guide and are movable relative to one another in the direction of a longitudinal axis of gear spring 14. In the exemplary embodiments shown in FIGS. 3 and 4, the axial guide has a pilot pin 24 and a guide sleeve 25 situated thereon. Pilot pin 24 is situated on first connection element 2 and guide sleeve 25 is situated on second connection element 3. Stator 18, rotor 19, and gear spring 14 are situated approximately concentrically to pilot pin 24.

Figure 6:
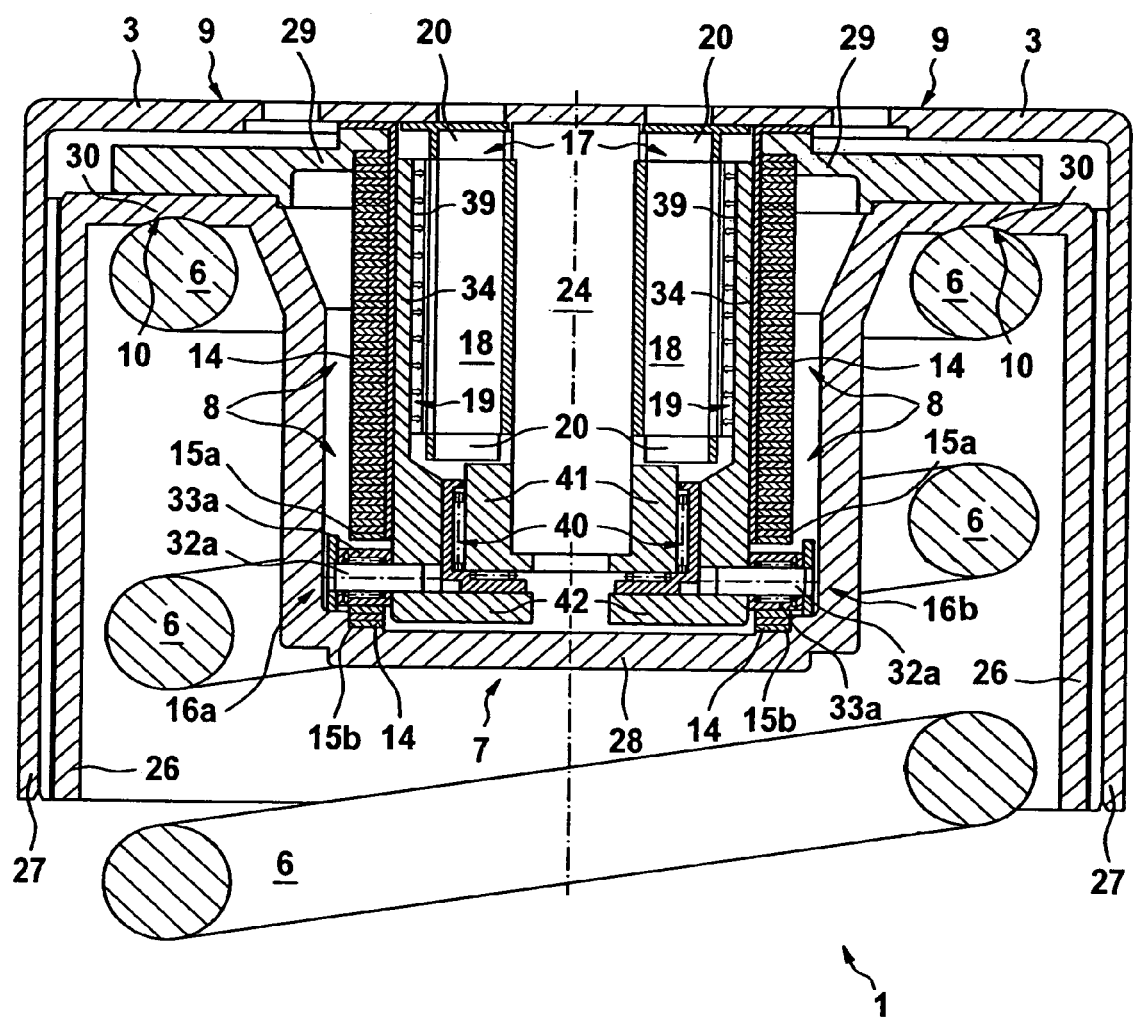
FIG. 6 shows a longitudinal section of a second exemplary embodiment of a device for suspension and level adjustment in motor vehicles.

In the exemplary embodiment shown in FIG. 6, the axial guide has an inner guide sleeve 26 and an outer guide sleeve 27 movable relative to the inner guide sleeve 26. Inner guide sleeve 26 is connected to first connection element 2 and outer guide sleeve 27 is connected to second connection element 3. Second connection element 3 may have a cup-shaped design. Drive motor 17 and gear spring 14 are at least partially situated in the space surrounded by inner guide sleeve 26. The external radial forces are decoupled from the forces generated by drive motor 17 and from the friction forces on the coils of gear spring 14.

According to the exemplary embodiment in FIGS. 3 and 4, adjusting device 7 has a housing part 28, which has approximately the shape of an inverted hat, in whose inner cavity gear spring 14 and drive motor 17 are provided. On its one end, the gear spring 14 is supported against a bottom of a housing part 28 and on its other end against a cover part 29 which is firmly connected to housing part 28. Cover part 29 may be welded, glued, or press-fitted to housing part 28. The spring ends of the spring band run in the circumferential direction against a shoulder on cover part 29 and housing part 28, respectively. Due to the catch of gear spring 14 between the shoulders and simultaneous axial pre-tensioning, the torque introduced by engagement elements 16a, 16b may be supported against cover part 29 and housing part 28.

Housing part 28 engages in the space surrounded by the coils of chassis spring 6. Second bearing point 10 is situated on the outer edge of housing part 28 and has a recess 30 for receiving the top coil of chassis spring 6. Pilot pin 24 is situated approximately centered on the bottom of hat-shaped housing part 28 and protrudes into the inner cavity of housing part 28.

The flange of second connection element 3 connected to guide sleeve 25 is situated approximately parallel to the edge area of housing part 28 having recess 30. The outer edge of the flange is connected to the outer edge of the hat-shaped housing part via an elastic gasket 31 which is designed as a corrugated bellows. The air pressure change during the adjustment of gear 8 in the inner cavity sealed by the bellows may be compensated via the deformation of the bellows. However, an air vent 44 may also be provided, as in the exemplary embodiment in FIGS. 3 and 4.

Figure 7:
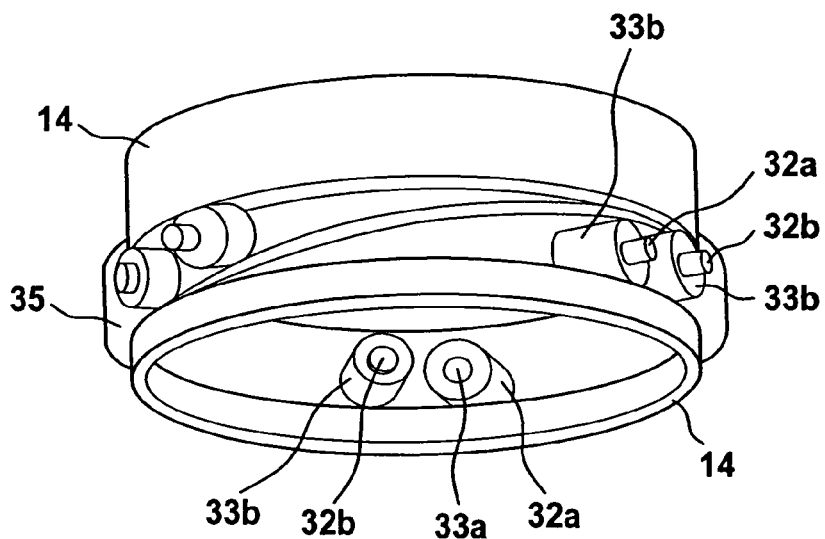
FIG. 7 shows a gear spring between whose coils engagement elements engage.
Figure 8:
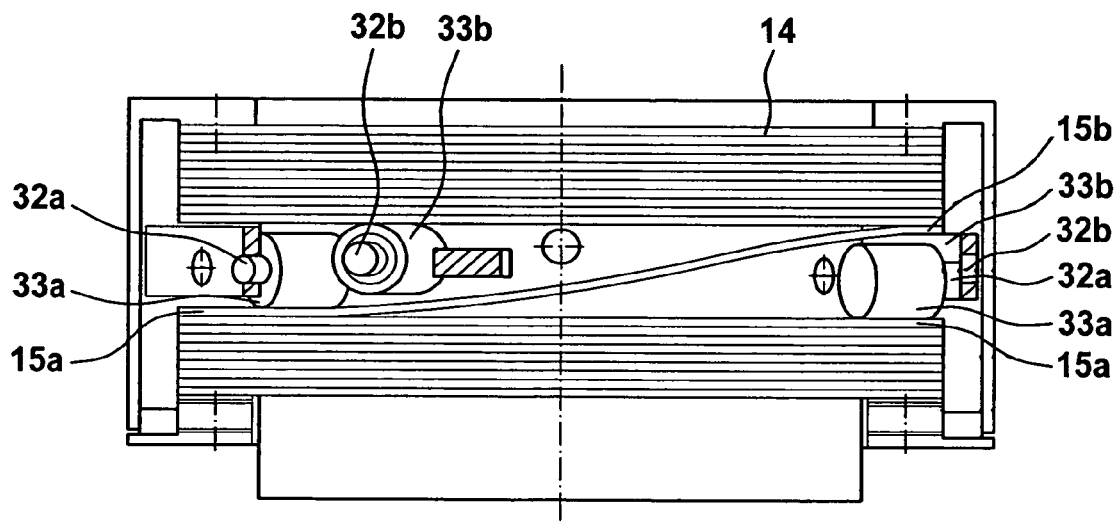
FIG. 8 shows a side view of the arrangement shown in FIG. 7.
Figure 9:
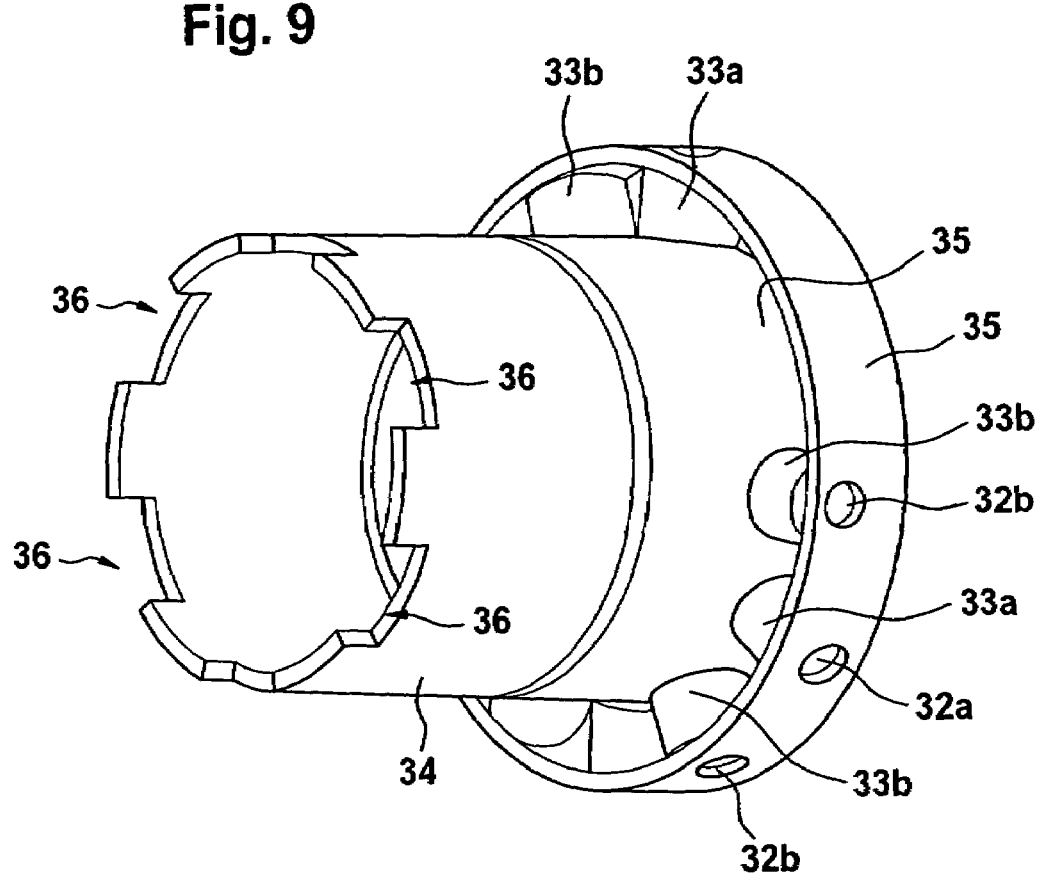
FIG. 9 shows a sleeve element including the engagement elements for the gear spring situated thereon.
Figure 10:
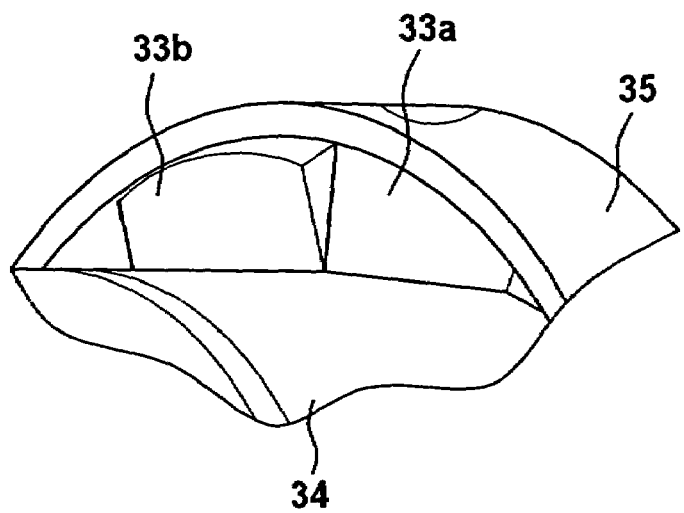
FIG. 10 shows an enlarged detail of FIG. 9 where the engagement elements are particularly easy to recognize.
Figure 11:
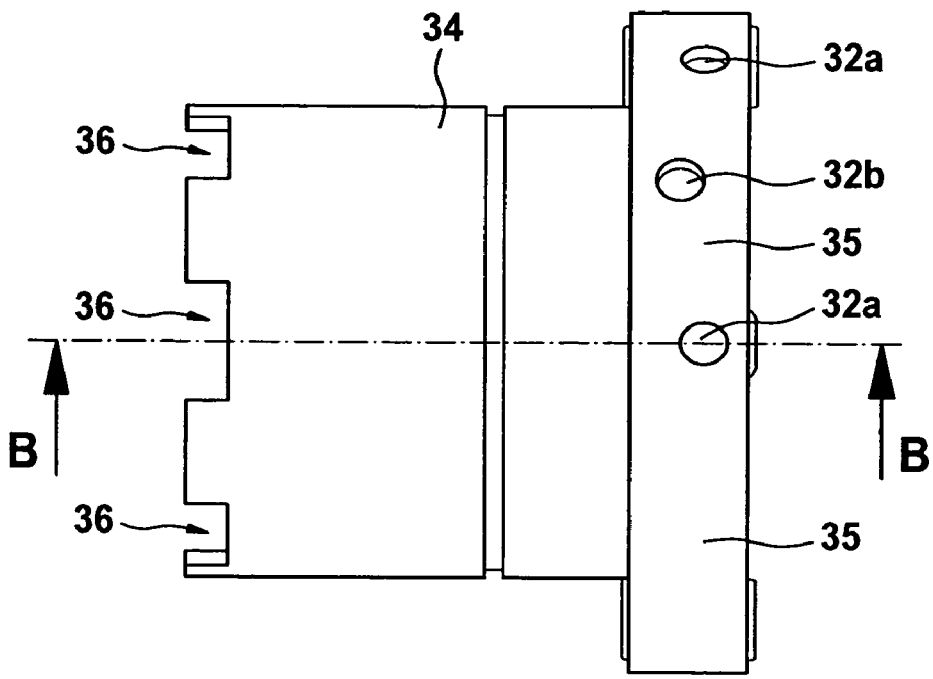
FIG. 11 shows a side view of the sleeve element including the engagement elements.
Figure 12:
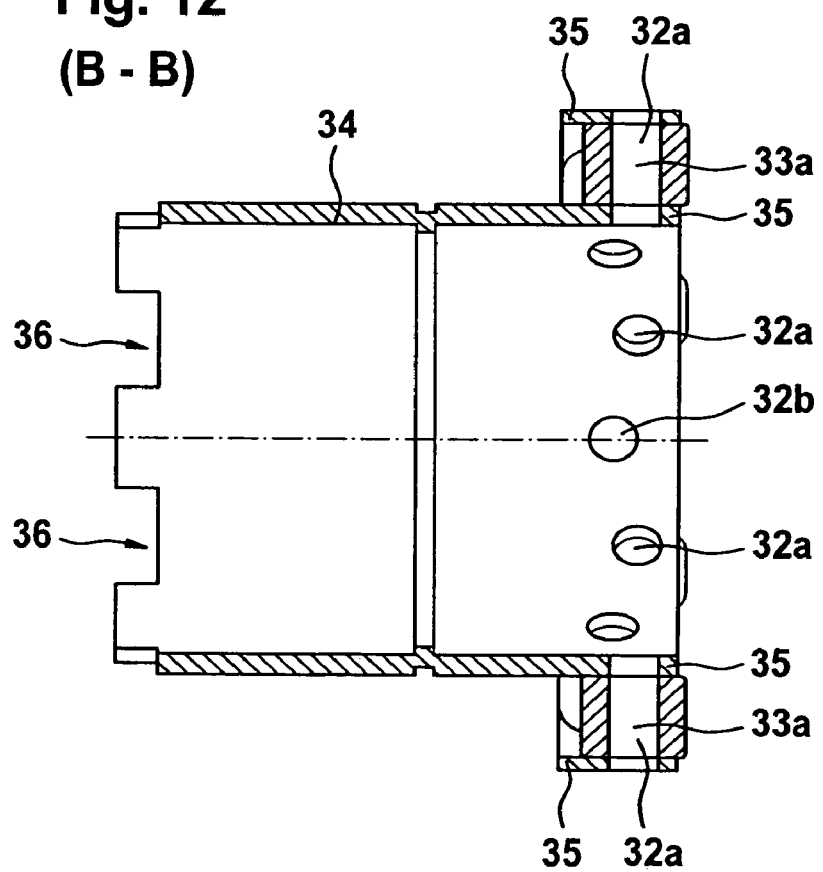
FIG. 12 shows a longitudinal section of the sleeve element along the section plane indicated with B in FIG. 11.
Figure 13:
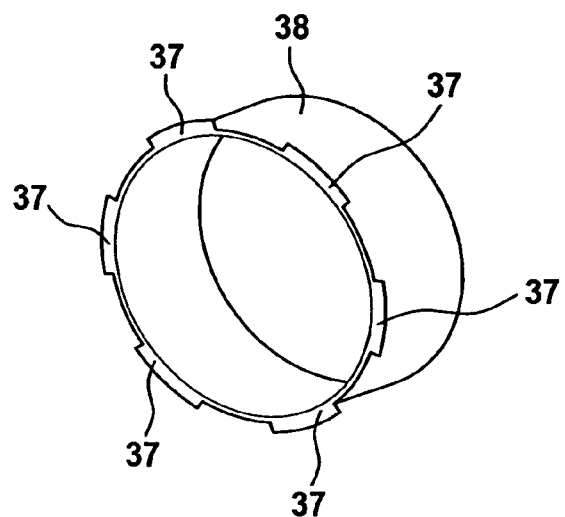
FIG. 13 shows a three-dimensional view of a rotor part of an electric motor.
Figure 14:
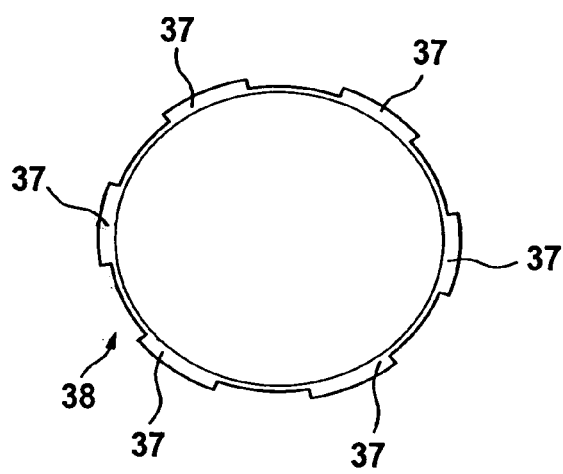
FIG. 14 shows a top view of the rotor part.
Figure 15:
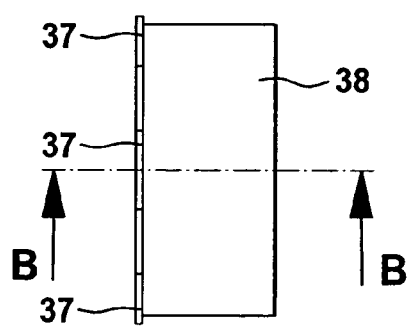
FIG. 15 shows a side view of the rotor part.
Figure 16:
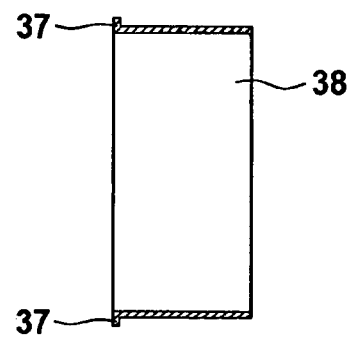
FIG. 16 shows a longitudinal section of the rotor part along the plane indicated with B in FIG. 15.

FIGS. 7 and 8 show engagement elements 16a, 16b each having an axle 32a, 32b on which, via an antifriction bearing, a roll 33a, 33b is pivotable in such a way that, during rotation of rotor 19, it rolls off gear spring 14. Rolls 33a, 33b are offset with respect to one another along a coil of the gear spring in such a way that multiple rolls 33a, 33b take hold of the coil simultaneously.

Axles 32a, 32b of rolls 33a, 33b of multiple rolls 33a, 33b laterally adjacent to one another and engaging between the same coils of gear spring 14 are offset with respect to one another transversely to the extension direction of the coils in such a way that a first group of rolls 33a takes hold only on the top side of the coil and a second group of rolls 33b takes hold only on the bottom side.

Adjusting device 7 has a sleeve element 34 situated approximately concentrically to gear spring 14 and in drive connection with drive motor 17, the sleeve element having on its one end an edge area bent approximately to a U-shape (FIGS. 9 through 12) which has two U-legs 35 connected by a U-cross bar. For each axle 32a, 32b U-legs 35 have two bearing openings which are aligned in the radial direction into which the respective axle 32a, 32b is inserted. Roll 33a, 33b assigned to axle 32a, 32b is situated between U-legs 35. A through-opening for roll 33a is provided in the U-cross bar for rolls 33a which take hold on the coil of gear spring 14 facing the front side of sleeve element 34.

At its end away from U-legs 35, sleeve element 34 has a plurality of annularly situated recesses 36 in which a plurality of protrusions 37 of a thin-walled rotor part 38 form-fittingly engage, the rotor part being situated concentrically to sleeve element 34 in its inner cavity. Permanent magnets 39 are situated on the internal cylindrical surface of rotor part 38, the permanent magnets magnetically cooperating with winding 20 of stator 18 via an air gap. Permanent magnets 39 are attached to the inner wall of rotor part 38. Rotor part 38 together with permanent magnets 39 may then be installed on sleeve element 34 as a pre-assembled checkable unit. However, it is also possible to attach permanent magnets 39 directly onto sleeve element 34.

Sleeve element 34 may be manufactured from a drawn tube which is bent at one end over a U shape. The through-openings for rolls 33a are then punched out of the U-cross bar, thereby making the part rigid. Moreover, the manufacture is simpler than in the case of a milled part. In order to minimize tolerances, the bearing openings for axles 32a, 32b are introduced into the already bent part. In order to prevent the coil of gear spring 14 from rubbing against the U-cross bar, the bearing opening is situated in the axial direction in such a way that, through the through-openings toward the coil, rolls 33a project over the U-cross bar.

An antifriction bearing 40 is provided between sleeve element 34 and guide sleeve 25, the antifriction bearing being designed in such a way that it transfers axial and radial forces from rotor part 38 to guide sleeve 25. Antifriction bearing 40 may be installed directly on guide sleeve 25 and rotor part 38 or may rest on at least one intermediate part.

An inner support 41 and an outer support 42 are provided as the intermediate parts in the exemplary embodiments shown in FIGS. 3, 4, and 6. During manufacture of gear 8, inner support 41 is pressed onto guide sleeve 25. Supports 41, 42 may be hardened and may at the same time be used as a track for the antifriction bearings. Another more cost-effective approach would be to let the axial antifriction bearing run on a bearing disk in order to save a heat treatment of inner support 41. Because of the low rotational speed and the relatively small radial forces, the radial antifriction bearing may also be designed as a slide bearing.

A guide tube 43 is provided for laterally guiding the coils of gear spring 14, the guide tube with its external cylindrical surface on the inside facing the internal circumference of gear spring 14. Guide tube 43 is firmly connected to second connection element 3, riveted or screwed, for example. A radial gap is provided between the exterior surface of guide tube 43 and the inner circumference of gear spring 14 whereby rubbing of gear spring 14 on guide tube 43 is largely avoided. Guide tube 43 may also be situated on the outer circumference of gear spring 14, but would then require more installation space. It can be seen in FIGS. 3 and 4 that guide tube 43 guides only those coils of gear spring 14 which, when force is applied to connection elements 2, 3, are interspersed with a force from the flux of force. Guiding of the rest of the coils of gear spring 14 is not necessary. A seal may be provided between guide tube 43 and cover part 29.

It should also be mentioned that the bottom of housing part 28 may be filled with oil. The oil level is advantageously selected in such a way that rolls 33a, 33b come in contact with the oil at least in their lowest position.

Sealing of drive motor 17 may be provided at different points. If antifriction bearing 40 has angular ball bearings or needle bearings, a sealed bearing for example may be provided on the motor side. It is also possible to provide an additional lip sealing ring or another sealing unit. For example, a lip sealing ring, a labyrinth seal, or a similar sealing element may be provided as the seal between rotor part 38 and guide tube 43. A lip seal, for example, could also be sprayed directly onto guide tube 43. Furthermore, a dense sealing grease, for example, could be situated between rotor part 38 and guide tube 43. The seal may be omitted if the radial bearing is a slide bearing.

Figure 17:
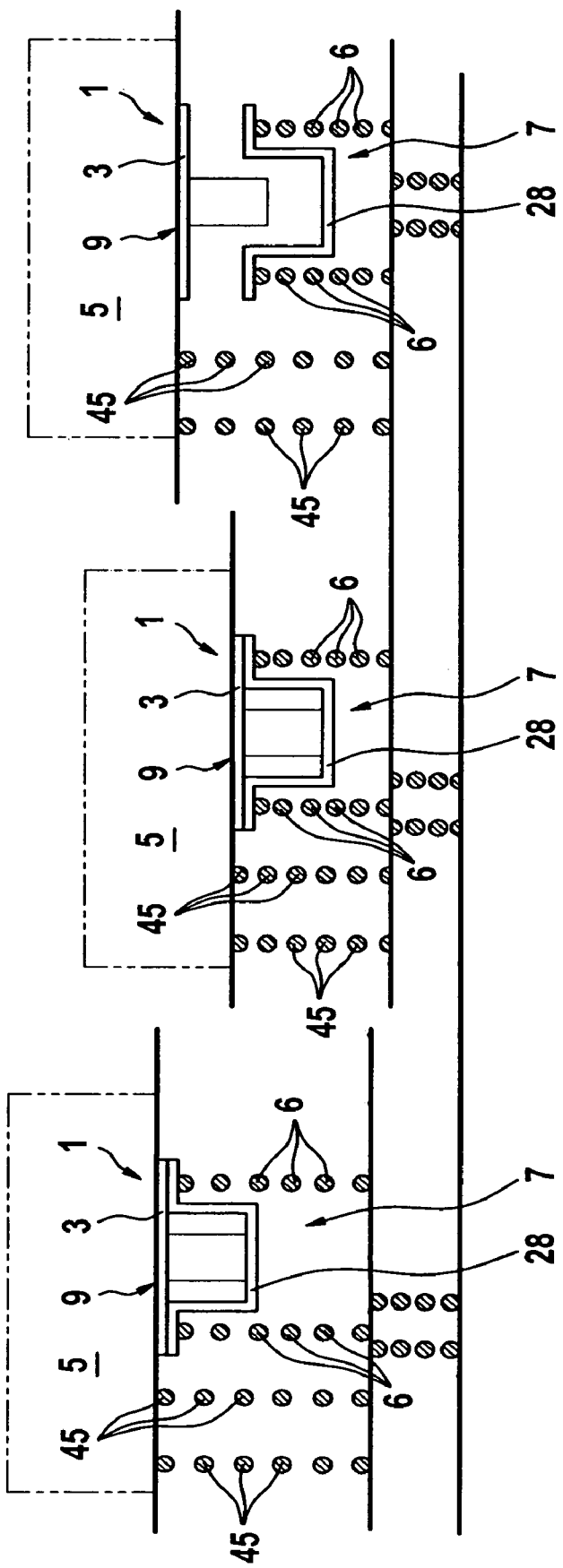
FIG. 17a shows a representation similar to FIG. 5a. However, an auxiliary spring is provided in addition to the chassis spring shown in FIG. 5a and the wheel is represented by a substitute spring.
FIG. 17b shows a representation similar to FIG. 17a. However, the motor vehicle is loaded.
FIG. 17c shows a representation similar to FIG. 17b. However, the shortening of the chassis spring caused by the load of the motor vehicle is compensated by appropriately adjusting the device for level adjustment.

In the exemplary embodiments shown in FIGS. 17a, 17b, and 17c, the device has an auxiliary spring 45 in addition to chassis spring 6 which is placed parallel to the arrangement formed by adjusting device 7 and chassis spring 6 and supports connection elements 2, 3 against one another. This auxiliary spring 45 may also be designed as a leaf spring, for example. The spring rigidity of chassis spring 6, for example the chassis spring of FIG. 5a, is between 30% and 60% of the resulting total spring rigidity of chassis spring 6 and auxiliary spring 45 placed in parallel to it.

Figure 18:
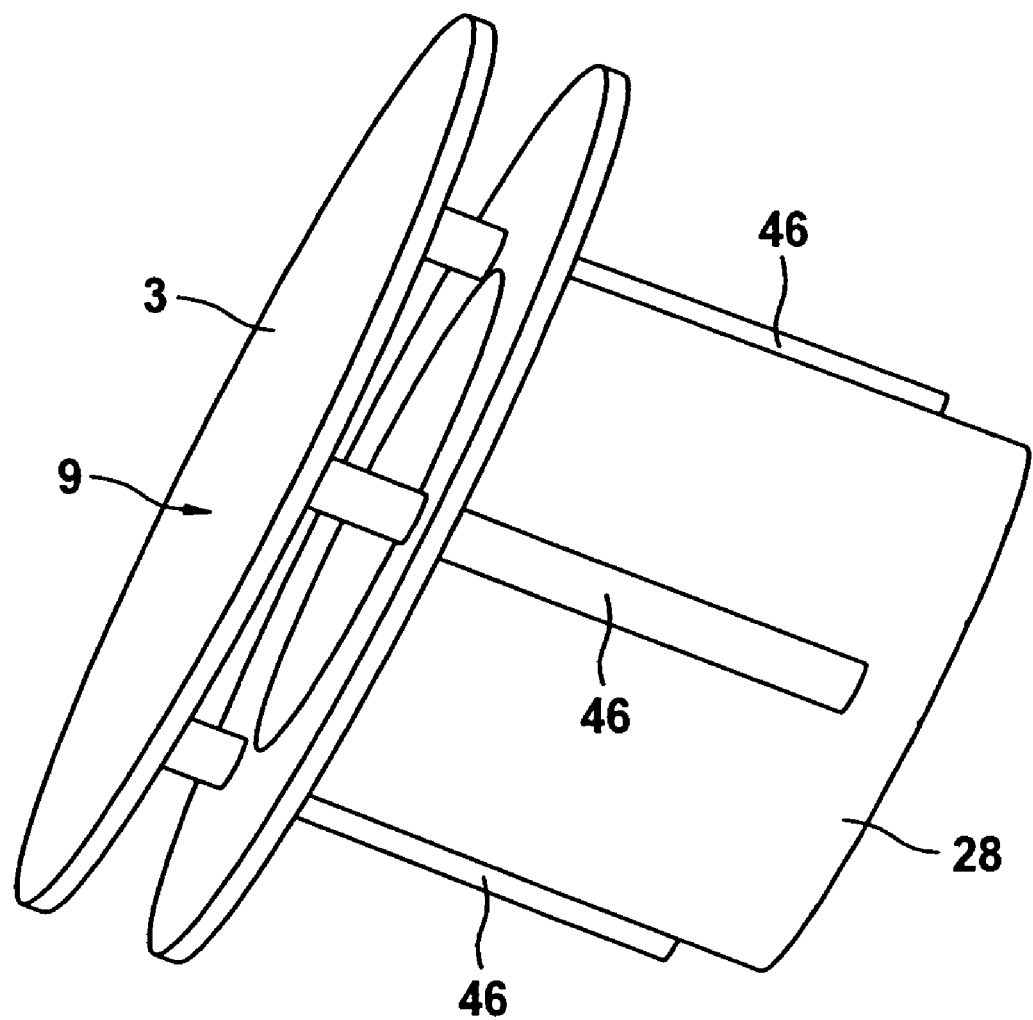
FIG. 18 shows another exemplary embodiment of an adjusting device.

It should also be mentioned that the axial guide connecting connection elements 2, 3 with one another may also have a plurality of guide bars 46 which are distributed over the circumference of gear 8 as it is indicated as an example in FIG. 18. Guide bars 46 reach through fitting openings in the edge of housing part 28.

LIST OF REFERENCE NUMERALS

1 device for suspension and level adjustment
2 first connection element
3 second connection element
4 vehicle wheel
5 body
6 chassis spring
7 adjusting device
8 gear
9 first bearing point
10 second bearing point
11 point of support
12 wheel axle
13 shock absorber
14 gear spring
15a upper coil
15b lower coil
16a engagement element
16b engagement element
17 drive motor
18 stator
19 rotor
20 winding
21 printed circuit board
22 electrical terminals
23 insulation layer
24 pilot pin
25 guide sleeve
26 inner guide sleeve
27 outer guide sleeve
28 housing part
29 cover part
30 recess
31 gasket
32a axle
32b axle
33a roll
33b roll
34 sleeve element
35 U-leg
36 recess
37 protrusion
38 rotor part
39 permanent magnet
40 antifriction bearing
41 inner support
42 outer support
43 guide tube
44 air vent
45 auxiliary spring
46 guide bar

What is claimed is:

1. A device for suspension and level adjustment in motor vehicles comprising:
   a first connection element for connecting to at least one vehicle wheel and a second connection element for connecting to the body of the motor vehicle,
   at least one chassis spring, and
   an adjusting device having a first and second bearing point adjustable in distance to one another via a gear drivable by a drive motor,
   the first bearing point being connected to or situated on one of the first and second connection elements and the second bearing point being supported against the other of the first and second connection elements via the chassis spring;
   the gear including a gear spring having at least two coils adjacent to one another and at least one engagement element engaging between the at least two coils, the gear spring being assigned to the one bearing point and the engagement element being assigned to the other bearing point, the gear spring and the engagement element being pivotably mounted relative to one another and, for adjusting the distance of the first and second bearing points, at least one of the gear spring and the engagement element capable of being be rotationally driven using the drive motor.

2. The device as recited in claim 1 wherein the drive motor is an electric motor.

3. The device as recited in claim 2 wherein the electric motor is a brushless EC motor.

4. The device as recited in claim 1 wherein the gear is a self-locking gear.

5. The device as recited in claim 1 wherein the drive motor is at least partially situated in a space surrounded by the coils of the gear spring.

6. The device as recited in claim 1 wherein the drive is an EC motor and includes an actuator for a winding, the actuator being situated in a space surrounded by the coils of the gear spring.

7. The device as recited in claim 1 wherein the drive motor is designed as an external-rotor motor having a rotor situated around a stator, and the engagement element is provided on an outer circumference of the rotor.

8. The device as recited in claim 1 wherein the drive motor is situated on the gear spring.

9. The device as recited in claim 1 wherein the drive motor is designed as an internal-rotor motor having a stator situated around an annular rotor, and the engagement element is provided on an inner circumference of the rotor.

10. The device as recited in claim 1 wherein the chassis spring is a coiled spring, a helical spring or a spiral spring, and the drive motor or the gear spring is at least partially situated in a space surrounded by the coils of the chassis spring.

11. The device as recited in claim 1 further comprising an axial guide, the connection elements being connected to one another and are movable relative to one another via the axial guide.

12. The device as recited in claim 10 wherein the axial guide includes a guide sleeve movably situated on a pilot pin, the drive motor or the gear spring being situated around the guide sleeve.

13. The device as recited in claim 12 wherein the adjusting device includes a hat-shaped housing part and wherein the pilot pin is centered on a bottom of the hat-shaped housing part in such a way that the pilot pin protrudes into an inner cavity of the housing part.

14. The device as recited in claim 12 wherein the adjusting device includes a hat-shaped housing part further comprising a flange extending transversely to a longitudinal axis of the guide sleeve, connected to same, and an external edge of the flange is connected to the external edge of the hat-shaped housing part via an elastic gasket, a corrugated bellows or a roll bellows in particular.

15. The device as recited in claim 11 wherein the axial guide has an inner guide sleeve and an outer guide sleeve movable relative to the inner guide sleeve, the drive motor or the gear spring being at least partially situated in the space surrounded by the inner guide sleeve.

16. The device as recited in claim 1 wherein the adjusting device includes a hat-shaped housing part with an inner cavity where the gear spring and the drive motor are provided, the housing part engages in the space surrounded by coils of the chassis spring, and the second bearing point of the adjusting device is situated on an external edge of the housing part.

17. The device as recited in claim 16 wherein the housing part has a recess for receiving one axial end of the chassis spring.

18. The device as recited in claim 1 wherein the coils of the gear spring distanced from the engagement element are in contact.

19. The device as recited in claim 1 wherein the at least one engagement element includes an axle on which, via an antifriction bearing, a roll is pivotably mounted in such a way that, during twisting of the engagement elements, it rolls relative to the gear spring.

20. The device as recited in claim 1 wherein the at least one engagement element includes a plurality of engagement elements offset with respect to one another along the coils of the gear spring in such a way that the engagement elements simultaneously move with respect to the coils.

21. The device as recited in claim 20 wherein axles of rolls of the engagement elements are situated side-by-side in a circumferential direction of the gear spring and engage between the coils of the gear spring, are offset with respect to one another transversely to the circumferential direction in such a way that a first roll or a first group of rolls takes hold of only one coil and a second roll or a second group of rolls takes hold of only the other coil.

22. The device as recited in claim 1 further comprising a sleeve element situated concentrically to the gear spring and in drive connection with the drive motor, the drive motor having one end an edge area bent approximately in a U-shape which has two U-legs connected to one another by a U-cross bar, the U-legs have at least two bearing openings aligned with respect to one another in the radial direction, into which an axle of the at least one engagement element is inserted, a roll being situated on the axle between the U-legs, a through-opening for the roll being provided in the U-cross bar, and the roll takes hold of the coils of the gear spring through the through-opening.

23. The device as recited in claim 22 wherein the sleeve element is supported pivotably around a longitudinal axis on the guide sleeve via an antifriction bearing or a slide bearing.

24. The device as recited in claim 1 further comprising a guide tube for lateral guiding of the coils of the gear spring which, when force is applied to the connection elements, are interspersed with a force from a flux of force.

25. The device as recited in claim 24 wherein the guide tube with its external cylindrical surface faces the interior of the coils.

26. The device as recited in claim 1 further comprising an auxiliary spring linking the connection elements directly or indirectly via at least one intermediate element.

27. The device as recited in claim 26 wherein the chassis spring has a spring rigidity between 30% and 60% of the resulting total spring rigidity of the chassis spring and the auxiliary spring.

28. The device as recited in claim 1 wherein the drive motor is situated on the outer circumference of the gear spring.

29. The device as recited in claim 1 wherein the drive motor is situated around the outer circumference of the gear spring.

* * * * *